United States Patent Office 3,476,770
Patented Nov. 4, 1969

3,476,770
2-METHYL-7-PHENYLINDOLE-3-ACETIC ACID COMPOUNDS
Robert A. Scherrer, White Bear Lake, Minn., assignor to Parke, Davis & Company, Detroit, Mich., a corporation of Michigan
No Drawing. Filed Apr. 14, 1967, Ser. No. 630,802
Int. Cl. C07d 27/56; A61k 27/00
U.S. Cl. 260—326.13
2 Claims

ABSTRACT OF THE DISCLOSURE 2-methyl-7-phenylindole-3-acetic acids, esters, and salts thereof, optionally methylated in the 1-position, useful as pharmacological agents having anti-inflammatory activity and their production by (a) intramolecular condensation of a levulinic acid 2-biphenylylhydrazone in the presence of an acid; (b) methylation of a metallated 2-methyl-7-phenylindole-3-acetic acid compound; (c) hydrolysis of a 2-methyl-7-phenylindole-3-acetic acid ester; and (d) esterification of a 2-methyl-7-phenylindole-3-acetic acid.

---

The present invention relates to new indole-3-acetic acid compounds and salts thereof that are useful as pharmacological agents and to methods for their production. More particularly, the invention relates to new 2-methyl-7-phenylindole-3-acetic acid compounds that are represented by the formula

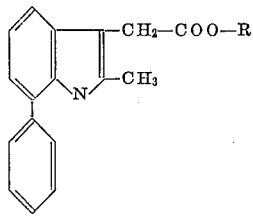

I where $R_1$ is hydrogen or methyl, and R represents hydrogen, a salt-forming cation, a lower alkyl radical, or an aminoalkyl radical having the formula

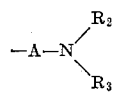

where A represents an alkylene group containing not more than four carbon atoms, separating the groups to which it is attached by at least two carbon atoms; and each of $R_2$ and $R_3$ is a lower alkyl radical containing not more than four carbon atoms, or $R_2$ and $R_3$ are combined, and together with the nitrogen atom to which they are attached, represent a heterocyclic amino radical, such as piperidino. The aminoalkyl radical can be present in free base or acid-addition salt form.

In accordance with the invention, 2-methyl-7-phenylindole-3-acetic acid compounds having the formula

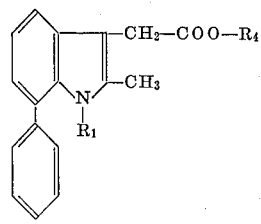

II are produced by the intramolecular condensation of a levulinic acid 2-biphenylylhydrazone compound having the formula

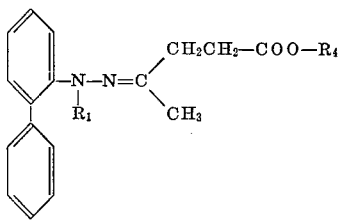

III in the presence of an acid; where $R_4$ represents hydrogen or lower alkyl and $R_1$ has the aforementioned significance. Acids that may be used to effect the condensation include zinc chloride, sulfuric acid, hydrochloric acid, polyphosphoric acid, and boron trifluoride etherate. The preferred acids are hydrochloric and sulfuric acids. The reaction is best carried out in an unreactive solvent medium. Suitable solvents include various ethers, lower alkanols, especially ethanol, acetic acid, and aromatic hydrocarbons, such as benzene, toluene, and methylnaphthalene. When the preferred hydrochloric acid or sulfuric acid is used in the reaction, additional solvent is not required if a large excess of acid is employed. In general, the exact amount of acid used is not critical. Best results are obtained when the preferred hydrochloric and sulfuric acids are used in moderate to large excess. Zinc chloride is effective in a catalytic amount, while boron trifluoride etherate is best employed in an amount equivalent to the amount of starting hydrazone compound. The temperature and duration of the reaction may be varied within wide limits. Best results are obtained when the reaction is carried out at a temperature betwen 80 and 120° C. for a period of 12 to 24 hours.

When the foregoing condensation is carried out in a lower alkanol solvent, the resulting product is an ester, that is, a compound having Formula II above wherein $R_4$ is lower alkyl. When the condensation is carried out in excess acid or in a solvent other than a lower alkanol, the resulting product is the free carboxylic acid.

Also in accordance with the invention, 1,2-dimethyl-7-phenylindole-3-acetic acid ester compounds having the formula

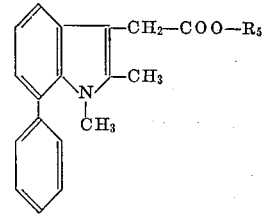

IV are produced by reacting a metallated 2-methyl-7-phenylindole-3-acetic acid compound having the formula

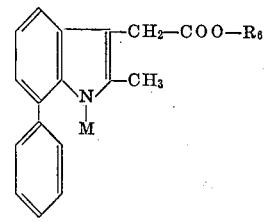

V with a methylating agent; where $R_5$ is lower alkyl; M represents an alkali metal or magnesium halide; and $R_6$ is lower alkyl or has the same meaning as M. The preferred starting materials for use in this reaction are the alkali metal salts, that is, the compounds of Formula V wherein M is an alkali metal. Of the alkali metal salts, the sodium salt is preferred. These starting materials, as well as those wherein M is magnesium halide, are most conveniently prepared in situ by reacting 2-methyl-7-phenylindole-3-acetic acid or a lower alkyl ester thereof with a strong base, such as an alkali metal hydride, amide, or alkoxide, or with an alkyl magnesium halide. The preferred methylating agent is a methyl halide, especially methyl iodide. Other methylating agents that may be employed are dimethyl sulfate or a methyl arylsulfonate. Suitable solvents that may be used include diethyl ether, dioxane, tetrahydrofuran, benzene, liquid ammonia, N-methyl-2-pyrrolidinone, and dimethylformamide. A preferred solvent is dimethylformamide. Best results are obtained when the methylating agent is employed in moderate to large excess. When $R_6$ in the metallated starting material of Formula V above is an alkali metal or magnesium halide, at least two moles of methylating agent are required per mole of the metallated indole compound. The reaction proceeds at a satisfactory rate at a temperature in the range of 0 to 50° C. The duration of the reaction will vary depending on the temperature employed. At room temperature and above the reaction is substantially complete within about 2 hours.

Further in accordance with the invention, 2-methyl-7-phenylindole-3-acetic acid compounds having the formula

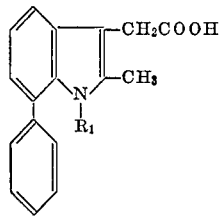

VI and carboxylate salts thereof are produced by hydrolyzing a 2-methyl-7-phenylindole-3-acetic acid ester compound having the formula

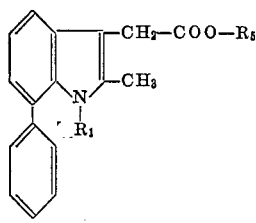

VII where $R_1$ and $R_5$ are as earlier defined. This hydrolysis reaction can be carried out under either acidic or alkaline conditions, by the use of an acidic or basic hydrolytic agent. Alkaline conditions are preferred. The hydrolysis can be carried out in water or in an aqueous solution of an unreactive, water miscible, organic solvent such as an aliphatic alcohol, dioxane, tetrahydrofuran, ethylene glycol, propylene glycol or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids such as p-toluenesulfonic acid, and acidic ion exchange resins. Preferred agents are alkali metal hydroxides such as sodium hydroxide or potassium hydroxide. The hydrolytic agent is normally employed in a considerable excess.

The hydrolysis is carried out by heating a solution or suspension of the starting material in a solvent medium containing an acid or a base until hydrolysis is substantially complete. In general, the reaction is carried out at a temperature between about 0 and 120° C., or at the reflux temperature of the solvent, during a period that may vary from one to about 60 hours. When one of the preferred basic hydrolytic agents is employed, the reaction is usually carried out at a temperature between about 60 and 120° C., and is substantially complete within 3 to 6 hours. When the hydrolysis is carried out under alkaline conditions, the product is present in the reaction mixture in the form of a salt; and it can be isolated in this form or, following treatment with an acid, preferably a mineral acid, it can be isolated as the free acid. When the hydrolysis is carried out under acidic conditions, the product is present in the reaction mixture as the free acid and it can be isolated directly in this form or, by subsequent treatment with a base, it can be isolated in salt form.

Further yet in accordance with the invention, 2-methyl-7-phenylindole-3-acetic acid ester compounds having the formula

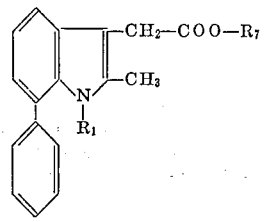

VIII are produced by reacting a 2-methyl-7-phenylindole-3-acetic acid compound having Formula VI above or a reactive derivative thereof with a compound having the formula

IX or a reactive derivative thereof; where $R_1$ is as defined previously, and $R_7$ is lower alkyl or an aminoalkyl radical having the formula

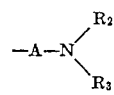

where A, $R_2$, and $R_3$ have the same meaning as given earlier. The compounds of Formula IX and their reactive derivatives serve as esterifying agents. Some examples of suitable reactive derivatives of the acid are the acid anhydride, acid halides, and alkali metal salts of the acid. Some examples of suitable reactive derivatives of the compounds of Formula IX are various esters such as methyl bromide, methyl iodide, ethyl iodide, propyl iodide, dimethyl sulfate, diethyl sulfate, 2-diethylaminoethyl chloride, 2-dipropylaminoethyl chloride, and 3-diethylaminopropyl bromide. Other reactive derivatives such as diazomethane can also be used.

When the esterifying agent is a lower alkanol or an aminoalkanol, the process is preferably carried out by heating the free acid or the anhydride or halide with an excess of the lower alkanol or aminoalkanol. An acidic catalyst such as hydrogen chloride, sulfuric acid, or benzenesulfonic acid is used when the free acid or the anhydride is one of the reactants. Additional solvents such as tetrahydrofuran, benzene, dioxane, or diethylene glycol dimethyl ether may be present but are not necessary. The reaction is commonly carried out at a temperature of about 25° C. or higher, preferably at 60-150° C. but not higher than the reflux temperature, and is normally completed within 5 to 100 hours with the free acid or within 1 to 5 hours with the anhydride or a halide.

When the esterifying agent is an ester of a lower alkanol or an ester of an aminoalkanol as illustrated above, the process is preferably carried out by heating the acid or salt thereof with the selected halide, sulfate, or other ester derivative in a solvent in the presence of a base. Some examples of suitable solvents are lower alkanols, tetrahydrofuran, dioxane, dimethylformamide, diethylene glycol dimethyl ether, and mixtures thereof. Some examples of suitable bases are inorganic alkalies and tertiary organic amines. At least one equivalent and preferably an excess of the esterifying agent is used. The reaction is usually carried out at a temperature from 25–150° C., preferably from 50–100° C., and under these conditions it is substantially complete within one hour.

When the esterifying agent is diazomethane, the process is preferably carried out in an unreactive solvent such as ether, tetrahydrofuran, diethylene glycol dimethyl ether or dioxane. The reaction proceeds very rapidly and is preferably carried out by treating the free acid with one equivalent or a slight excess of diazomethane at 0 to 25° C., under which conditions the esterification is complete within less than 5 minutes.

In the case of the production of the aminoalkyl esters of the invention, the product can be isolated, by pH adjustment, either as the free base or as an acid-addition salt.

The free acids and the free bases of the invention form salts with a variety of organic or inorganic bases or acids. Some examples of suitable bases are sodium hydroxide, potassium hydroxide, calcium hydroxide, aluminum hydroxide, sodium carbonate, potassium bicarbonate, choline, 2-hydroxyethylamine, ammonia, and diethylamine. Some examples of suitable acids are hydrochloric acid, hydrobromic acid, sulfuric acid, phosphoric acid, acetic acid, citric acid, tartaric acid, and sulfamic acid. The preferred carboxylate salts of the invention are the pharmaceutically-acceptable salts of an alkali metal, an alkaline earth metal, ammonia, or a substituted ammonia. Preferred acid-addition salts of the invention are the mineral acid salts. The carboxylate salts and acid-addition salts with pharmaceutically-acceptable cations and anions differ in solubility properties from the free acids and free bases but are otherwise equivalent for the purposes of the invention.

The compounds of the invention are new chemical compounds that are useful as pharmacological agents. They are anti-inflammatory agents that can be used in the relief of inflammatory conditions as well as in the prevention or suppression of the occurrence of inflammation. They are preferably administered by the oral route although parenteral administration can also be used. The compounds of the invention can be employed in either free acid, ester, or salt form, and can be combined with either a solid or liquid carrier or diluent and made available in varying amounts in such pharmaceutical forms as tablets, capsules, powders and aqueous and nonaqueous suspensions and solutions.

The preferred compounds of the invention, because of their high degree of anti-inflammatory activity, are 2-methyl-7-phenylindole-3-acetic acid and pharmaceutically-acceptable carboxylate salts thereof.

The invention is illustrated by the following examples.

Example 1

A mixture consisting of 15.1 g. of ethyl levulinate 2-biphenylylhydrazone and 90 ml. of concentrated hydrochloric acid is heated under reflux for 24 hours, cooled, diluted with an equal volume of water, and made alkaline with saturated aqueous sodium bicarbonate. The alkaline mixture is washed well with ether and made acid again with 1 N hydrochloric acid. The acidic solution is then extracted with ether, and the ether extract is evaporated to give 2-methyl-7-phenylindole-3-acetic acid; M.P. 166° C. (with decomposition), following successive crystallizations from benzene-cyclohexane, benzene and aqueous ethanol.

In the foregoing procedure, the same product is obtained when 10 g. of levulinic acid 2-biphenylylhydrazone is substituted for the ethyl levulinate 2-biphenylylhydrazone.

To a solution of 2.65 g. of 2-methyl-7-phenylindole-3-acetic acid in 25 ml. of ethanol is added 10 ml. of 1 N aqueous sodium hydroxide, and the resulting mixture is evaporated to dryness under reduced pressure to give 2-methyl-7-phenylindole-3-acetic acid sodium salt.

A solution of 1.4 g. of choline chloride in 10 ml. of methanol is added to 2.87 g. of 2-methyl-7-phenylindole-3-acetic acid sodium salt in 50 ml. of methanol. The mixture is stirred for one hour, the insoluble sodium chloride is removed by filtration, and the filtrate is evaporated to dryness under reduced pressure to give 2-methyl-7-phenylindole-3-acetic acid choline salt.

The starting materials used in the foregoing procedure are prepared as follows. A mixture consisting of 10 g. of 2-biphenylylhydrazine, 7 g. of levulinic acid, and 68 ml. of absolute ethanol is heated under reflux for 6 hours and then evaporated to dryness to give levulinic acid 2-biphenylylhydrazone, M.P. 89–91° C. (with decomposition). This hydrazone intermediate (14.1 g.) is dissolved in 140 ml. of absolute ethanol, 14 ml. of sulfuric acid is added, and the mixture is heated under reflux for 7 hours and then evaporated to dryness to give the desired ethyl levulinate 2-biphenylylhydrazone starting material as a brown oil that is suitable for use without further purification.

Example 2

A mixture consisting of 80.8 g. of 2-biphenylylhydrazine, 51 g. of levulinic acid and 500 ml. of absolute ethanol is heated under reflux for 6 hours; 100 ml. of concentrated sulfuric acid is then added; and the resulting acidic mixture is heated under reflux for an additional 24 hours. It is next evaporated to remove most of the solvent, and the residue is first washed with aqueous sodium hydroxide and then extracted successively with ether and with benzene. The extracts are combined, evaporated to dryness and the oily residue obtained is purified by chromatography on a column prepared from 1235 g. of activated magnesium silicate (Florisil). The desired product, ethyl 2-methyl-7-phenylindole-3-acetate, is obtained by eluting the column with a 1:1 mixture of cyclohexane-benzene and with benzene and evaporating the eluates under reduced pressure; M.P. 71–86° C.

Example 3

A mixture consisting of 26.2 g. of ethyl 2-methyl-7-phenylindole-3-acetate, 75 g. of 50% aqueous sodium hydroxide, and 260 ml. of ethanol is heated under reflux for three hours, concentrated to remove the ethanol solvent, diluted with an equal volume of water, and filtered through diatomaceous silica (Standard Super-Cel). The filtrate is acidified with 1 N hydrochloric acid and the 2-methyl-7-phenylindole-3-acetic acid that precipitates is isolated, dried and crystallized from ethanol; M.P. 166–168° C. (with decomposition).

A solution of 1.5 g. of ammonia in 10 ml. of ethanol is added to a hot solution of 2.7 g. of 2-methyl-7-phenylindole-3-acetic acid in 25 ml. of ethanol, and the resulting mixture is evaporated to dryness to give 2-methyl-7-phenylindole-3-acetic acid ammonium salt as a white solid. The diethylamine salt is prepared similarly by substituting 2.0 g. of diethylamine for the ammonia.

Example 4

A mixture consisting of 8.1 g. of methyl 1,2-dimethyl-7-phenylindole-3-acetate, 21 g. of 50% aqueous sodium hydroxide, and 75 ml. of ethanol is heated under reflux for three hours, concentrated to remove the ethanol solvent, and diluted with an equal volume of water. The aqueous mixture is extracted with ether, the ether extracts are discarded, and the aqueous solution is acidified with 1 N hydrochloric acid. The 1,2-dimethyl-7-phenylindole-3-acetic acid that precipitates is isolated, dried, and crystallized successively from ethanol and from benzene; M.P. 153.5–154.5° C.

To a solution of 2.79 g. of 1,2-dimethyl-7-phenylindole-3-acetic acid in 50 ml. of methanol is added 0.69 g. of potassium carbonate in portions, and the resulting mixture is heated under reflux for 30 minutes and then evaporated to dryness under reduced pressure to give 1,2-dimethyl-7-phenylindole-3-acetic acid potassium salt as a white, powdery solid.

The methyl 1,2-dimethyl-7-phenylindole-3-acetate that is used as a starting material in the foregoing procedure is prepared as described in Example 5, which follows.

Example 5

A 50% sodium hydride-mineral oil dispersion (2.46 g.) is suspended in 20 ml. of N,N-dimethylformamide, and to the resulting suspension is carefully added a solution of 6.7 g. of 2-methyl-7-phenylindole-3-acetic acid in 16 ml. of N,N-dimethylformamide. When hydrogen evolution has ceased, the mixture is heated at 50° C. for 30 minutes, cooled, and 19.3 g. of methyl iodide is added. After 15 minutes more of heating at about 40° C., the solution is diluted with an equal volume of water and extracted with ether. The ether extracts are dried and evaporated to give the methyl ester of 1,2-dimethyl-7-phenylindole-3-acetic acid, isolated as a viscous oil.

Example 6

A solution of 2.7 g. of 2-methyl-7-phenylindole-3-acetic acid in 100 ml. of ethanol containing 10 ml. of concentrated hydrochloric acid is heated under reflux for 18 hours, evaporated under reduced pressure, and the residue is dissolved in ether. The ether solution is washed with saturated aqueous sodium bicarbonate and with water, dried, and evaporated under reduced pressure to give the ethyl ester of 2-methyl-7-phenylindole-3-acetic acid.

Example 7

To a stirred solution of 2.79 g. of 1,2-dimethyl-7-phenylindole-3-acetic acid in 40 ml. of diethyl ether, kept at about 15° C., is added dropwise a solution of diazomethane in either (20% by weight) until a yellow color persists and vigorous foaming stops. The resulting solution is kept at room temperature overnight, washed well with saturated aqueous sodium bicarbonate, dried, and evaporated under reduced pressure to give a residue of the methyl ester of 1,2-dimethyl-7-phenylindole-3-acetic acid.

Example 8

A mixture consisting of 2.79 g. of 1,2-dimethyl-7-phenylindole-3-acetic acid, 1.4 g. of methyl iodide, 1.4 g. of potassium carbonate, and 100 ml. of N,N-dimethylformamide is heated at 60° C. for 2 hours, cooled, and diluted with an equal volume of water. The aqueous mixture is extracted well with ether, and the ether extract is dried and evaporated to give the methyl ester of 1,2-dimethyl-7-phenylindole-3-acetic acid.

In the foregoing procedure, with the substitution of 1.56 g. of ethyl iodide for the methyl iodide, there is obtained the ethyl ester of 1,2-dimethyl-7-phenylindole-3-acetic acid.

Example 9

A mixture consisting of 26.5 g. of 2-methyl-7-phenylindole-3-acetic acid, 14.4 g. of 2-dimethylaminoethyl chloride hydrochloride, 20.2 g. of triethylamine, and 125 ml. of N,N-dimethylformamide is heated at 90–100° C. for 24 hours, cooled, and diluted with 250 ml. of ether. The ethereal mixture is filtered to remove solid triethylamine hydrochloride, and the filtrate is extracted with excess dilute hydrochloric acid. The acidic extract is then made alkaline (pH 10) by the addition of solid sodium carbonate, and the alkaline solution is extracted with ether. The ether extract is washed with water, dried, and evaporated to yield the 2-dimethylaminoethyl ester of 2-methyl-7-phenylindole-3-acetic acid. The hydrochloride salt of this ester can be obtained by treating the ethereal solution of the basic ester with an excess of dry hydrogen chloride and isolating and drying the salt that precipitates.

By utilizing the foregoing procedure, with the substitution of 18.6 g. of 3-diethylaminopropyl chloride hydrochloride for the 2-dimethylaminoethyl chloride hydrochloride there is obtained the 3-diethylaminopropyl ester of 2-methyl-7-phenylindole-3-acetic acid and the hydrochloride salt thereof.

Example 10

A mixture consisting of 14.89 g. of the acid chloride of 1,2-dimethyl-7-phenylindole-3-acetic acid, 15.2 g. of 2-piperidinoethanol, and 150 ml. of benzene is kept at room temperature overnight and then diluted with 150 ml. of ether. The ethereal mixture is washed with 0.5 N aqueous sodium hydroxide and with saturated aqueous sodium chloride, dried, and evaporated to give a residue of the 2-piperidinoethyl ester of 1,2-dimethyl-7-phenylindole-3-acetic acid. The hydrochloride salt is obtained by dissolving the free base ester in ether and treating the solution with one equivalent of hydrogen chloride.

The acid chloride of 1,2-dimethyl-7-pheynlindole-3-acetic acid used as a starting material above is prepared as follows. A mixture of 13.95 g. of 1,2-dimethyl-7-phenylindole-3-acetic acid and 75 ml. of thionyl chloride is kept at room temperature for two days and then concentrated to remove excess thionyl chloride. Benzene (200 ml.) is added to the residue, and the benzene solution is evaporated under reduced pressure to give the desired acid chloride, suitable for use without further purification.

I claim:

1. A 2-methyl-7-phenylindole-3-acetic acid compound having the formula

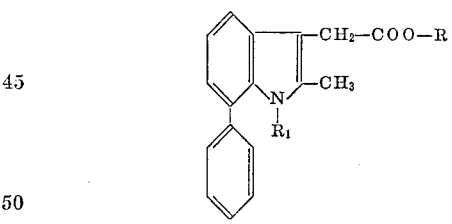

where $R_1$ is a member of the class consisting of hydrogen and methyl; and R is a member of the class consisting of hydrogen, an alkali metal cation, an alkaline earth metal cation, an ammonium ion, a di(lower alkyl)ammonium ion, a tri(lower alkyl)ammonium ion, a 2-hydroxyethylammonium ion, a (2-hydroxyethyl)trimethylammonium ion, a lower alkyl radical, and an aminoalkyl radical having the formula

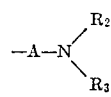

where A represents an alkylene group containing not more than four carbon atoms, separating the groups to which it is attached by at least two carbon atoms; and $R_2$ and $R_3$ are members of the class consisting of a lower alkyl radical containing not more than four carbon atoms and a further member in which $R_2$ and $R_3$ are combined, and together with the nitrogen atom to which they are attached, represent piperidino.

2. A compound according to claim 1 wherein R and R₁ are both hydrogen.

References Cited

UNITED STATES PATENTS 3,161,654  12/1964  Shen _____ 260—326.12

OTHER REFERENCES

Stevens et al., J. Am. Chem. Soc., 76: 2206–07 (1954).

Wagner et al., Synthetic Organic Chemistry, pp. 480–81, pp. 666–67 (1953).

ALEX MAZEL, Primary Examiner

J. A. NARCAVAGE, Assistant Examiner

U.S. Cl. X.R.

260—294.3, 326.14, 471; 424—267, 274